United States Patent [19]

Baram

[11] 4,214,727
[45] Jul. 29, 1980

[54] VALVE APPARATUS

[76] Inventor: Martin Baram, 13 Svanholmvej, 2660 Brøndby Strand, Denmark

[21] Appl. No.: 948,033

[22] Filed: Oct. 2, 1978

[30] Foreign Application Priority Data

Oct. 25, 1977 [DK] Denmark .............. 4733/77

[51] Int. Cl.² .......................................... F16K 31/143
[52] U.S. Cl. ..................................... 251/63.4; 92/107;
        251/63.6; 251/335 B; 251/214
[58] Field of Search ................. 92/107, 108; 137/509,
        137/510, 557; 251/61.2, 61.4, 61.5, 62, 63, 63.4,
        63.5, 63.6, 334, 335 B, 306, 14

[56] References Cited

U.S. PATENT DOCUMENTS

| 103,893 | 6/1870 | Kent | 137/557 |
|---|---|---|---|
| 1,147,937 | 7/1915 | Gleeson | 251/14 |
| 2,111,230 | 3/1938 | Toussaint | 251/335 B |
| 2,158,436 | 5/1939 | Shaw | 251/61.4 |
| 2,499,527 | 3/1950 | Raymond | 251/335 B |
| 2,765,185 | 10/1956 | Mott | 251/214 |
| 2,890,014 | 6/1959 | Luoma et al. | 251/14 |
| 2,908,477 | 10/1959 | Buri | 251/14 |
| 3,528,087 | 9/1970 | Perkins | 251/335 B |
| 3,991,974 | 11/1976 | Bonafous | 251/306 |
| 4,025,050 | 5/1977 | Manki et al. | 251/306 |

FOREIGN PATENT DOCUMENTS

| 1166576 | 3/1964 | Fed. Rep. of Germany . |
| 1600870 | 7/1973 | Fed. Rep. of Germany . |
| 1905022 | 3/1978 | Fed. Rep. of Germany | 251/61.4 |
| 1227353 | 8/1960 | France | 251/335 B |

Primary Examiner—Martin P. Schwadron
Assistant Examiner—G. L. Walton
Attorney, Agent, or Firm—Hubbell, Cohen, Stiefel & Gross

[57] ABSTRACT

The invention pertains to a valve for fluid and gaseous materials consisting of a valve housing which at one end has a first port with a controllable closure member which is connected to a second port, said valve having at its other end control organs for the closure member.

42 Claims, 3 Drawing Figures

VALVE APPARATUS

BACKGROUND OF THE INVENTION

1. Field of the Invention

The present invention relates to valves, and more particularly valves for use with fluid and gaseous materials.

2. Description of Prior Art

Most valves known in the art are such that the control organs include a turnable valve stem which from the outside of the valve passes through a channel in the housing to the closure member. The channel with the stem are sealed by gaskets, and in some cases by a bellows. An important drawback of such valves is that they do not indicate any failure of the control mechanism by self-locking the valve. Another drawback is that the closure members are inside the housing, and thus difficult to get at. Furthermore, the packings around the turnable stem can constitute an area of failure which may become dangerous in conjunction with high-pressure systems and aggressive materials. It is the aim of this invention to disclose a valve which does not have the indicated weaknesses, and which offers considerable advantages, i.e. that it may be manufactured both in relatively simple and inexpensive designs for simple duties, and in more complicated designs for increased safety, that it may be controlled from a distance, that it may function as a sample-extracting-cock or as a control or gate valve.

SUMMARY OF THE INVENTION

The new valve in its basic design is characterized by a valve housing which at one end has a first port with a controllable closure member which is connected to a second port. At its other end, the valve has control organs for the closure member. The control organs open the first port with an outwardly directed linear movement, with the closure member being fastened to the end of a linearly movable rod which extends from the first port through a flow chamber and further through a core in the other end of the valve housing. From there the rod extends through a pressure chamber to a firm connection with the end plate of a linearly movable piston which surrounds the other end of the housing in gliding mutual contact. The piston is connected at its lower end to one end of a spring pipe which coaxially surrounds the valve housing and is fastened at its other end to a flange on the valve housing. The valve is normally closed because of the pressure of the flow against the closure member and the pressure of the spring pipe against the piston with its pull on the stem. If the valve is used as a safety valve, its functioning is determined by the force of the spring pipe exerted on the closure member which will be adjusted to the normal pressure in the system to be secured in such a way that it can be displaced when the pressure in the system exceeds a certain level. Thus, the valve can only be opened either by pressure from the outside against the piston or from the inside by pressure against the internal surface of the closure member. Acting as a safety valve the flow of the material is reversed as related to all other uses of the valve. The closure member in the valve is very easy accessible. Furthermore, the spring pipe acts also as outer sealing preventing any material which may have penetrated through the bore in the core and via the top chamber from reaching the outer atmosphere. Spring pipes for very high pressures and durable in the presence of very aggressive materials are obtainable in shapes that enables them to be fastened in any known manner, for example by ring nuts, to the piston and the housing, respectively. In case the valve is to be used as a sample-extracting-cock, the closure member is positioned outside the first port and its seat is situated on the annular outer surface of the port, the material thus flowing directly from the system without encountering dead angles or hollow spaces in front of the closure member which may have harbored residues from earlier samples. In addition, in this position it is even easier to inspect and correct the closure member and its seat. The closure member may have a substantially spherical shape which fits into a corresponding seat, which arrangement is preferably used in case the flow carries particles, as the spherical form diminishes the possibility of sedimentations both when the valve is open or closed. Preferably, the closure member or the seat are coated with a resilient material to enhance the sealing properties thereof. The sealing material is preferably capable of smelting or evaporating at high temperatures, particularly if placed in contact with fire. Thus, the melting sealing material can fuse the closure member to its seat, metal against metal, so that burning material cannot reach the other side of the valve. This function may be enhanced by either employing a sealing material which evaporates without fast residues or by employing a material that, when smelting, forms a fireproof sealing mass. The internal fluid and gas tightness is enhanced by making the core in at least two parts, including at least one seal, with the seals being situated between a foremost and a rearmost core. The seals can preferably be tightened or replaced by means of a screwable part of the core. Alternatively, the seals can be tightened with the help of the pressure exerted by the material which flows through channels connecting the flow chamber, through the foremost core, with the seals.

In order to readily adjust the pressure of the closure member against the seat, the rod is fastened to the piston by a thread and the closure member is provided with a surface enabling the use of a tool. The threaded connection between the stem and the piston can be used to shorten or lengthen the distance between the closure member and the piston and thus to increase the pressure or vice versa. This is important especially when the valve is to be used as a safety valve. A further increase in the overall tightness of the valve is obtained by furnishing the valve with seals between the piston and the housing at their mutually gliding surfaces and by soldering, welding or glueing the spring pipe fast at both ends to the opposing parts of the valve. To secure the spring pipe in said manner need not cause maintenance difficulties when the closure member has to be removed and replaced which can be done without touching the control mechanisms.

When the valve is furnished with all the sealings, its control mechanisms include three lines of defense against the emission of dangerous materials to the atmosphere, among which the spring pipe is the safest of the mechanical stresses. The internal pressure and length of stroke are preferably kept within the limits prescribed by the manufacturers. The same applies to chemical aggression.

Various external controls of the valve, which are generally simple, may be employed. Thus, the piston may be exposed to manual control and the valve may be provided with an integrated remote control means which presses against the piston. The remote control means may preferably include a pressure chamber which surrounds the piston by an end plate and a cylindrical part which runs coaxially with the housing and is fastened to the flange, with the aforementioned cylindrical part having a mutually gliding surface against the piston's outer surface, and with the pressure chamber preferably being fitted to receive pneumatic, hydraulic or electric pressure means. In addition, the valve is preferably provided with seals at the mutually gliding surface between the piston and the cylindrical part of the pressure chamber. In all cases, it should be noted that failures for whatever reason in the control system will preferably result in the closure of the valve. The aforementioned remote control arrangement is elegant in that the application of pressure mediums can be accommodated in an integrated part of the valve which does not increase its external dimensions to a considerable degree. It must also be mentioned that the manual activation cannot prevent the closing of the valve which may be the case with all valves which are manually activated by turning a handwheel.

Preferably the outer pressure surface of the piston has a larger area than the outer surface of the closure member which means that the valve can be controlled by a pressure which is considerably below the pressure in the system. For example, if the pressure in the system is 60 bar and the area of the piston facing the control pressure medium is 10 times the area of the closure member then the control pressure needed, taking a certain force of the spring pipe and some friction into consideration, may be 10 bars. If desired, the outer pressure surface of the piston may preferably have a smaller area than the combined surfaces of the closure member, the internal pressure surface of the piston and the surface of the piston facing the internal space of the spring pipe. This arrangement makes it possible, with the help of excessive pressure inside the valve, to sense that the seals around the stem or even the seals between piston and spring pipe have been penetrated by material from the system. This can be exploited to alarm the personnel by means of pressure monitors known in the art. No similar safety feature is known to exist in any other valve. In case the force of the spring pipe is not sufficient to ensure the closing of the closure member the valve can be strengthened by providing the pressure chamber under the piston with a booster spring and by providing the space inside the spring pipe with a booster spring pressing against the piston and the flange, respectively.

The valve may preferably be employed independently of the direction of the flow by fitting the valve for flow from the first port to the second port and vice versa. The preferred valve can function to advantage by having a sealing bellows in place of the sliding seals along the stem. In this regard, the flow chamber is provided with a sealing bellows surrounding the lower part of the rod, being fastened to it fluid and gas tight at one end, and at its other end in the same manner to the central part of either the housing or the core. This construction can be much simpler and under most circumstances more durable. It may also be the best solution in the presence of abrasive particles in the material. The safety of the valve may be considerably enhanced by providing a channel running from the inner space of the spring pipe either through the flange or the piston to a monitor chamber which contains suitable instruments to indicate the atmospheric pressure and purity inside the spring pipe. The indication of atmospheric pressure is directly related to whether the valve is open or closed as this is accompanied by corresponding compression or decompression of the spring pipe. The monitoring of the purity of the atmosphere, for example its content of oxygen in said control chamber, provides most valuable information on the state of the various internal seals in the valve well in advance of any danger to the outside. The valve can also be closed by a positive signal independently of the spring force in the spring pipe. In this regard, the cylindrical part of the pressure chamber at any point opposite the spring pipe is preferably provided with a suitable channel for enabling introduction of a pneumatic or hydraulic pressure medium into the space defined by the part of the pressure chamber and the piston as well as by the flange of the housing and the spring pipe. This arrangement also means that the position of the closure member can be variated and held fast in accordance with the desired rate of flow through the valve.

In addition, the end plate of the pressure chamber is preferably provided with a threaded bore to be used in conjunction with a handwheel having a correspondingly threaded stem. If desired, the bore may be plugged by a plug.

DETAILED DESCRIPTION OF THE PREFERRED EMBODIMENTS

Figure 1:
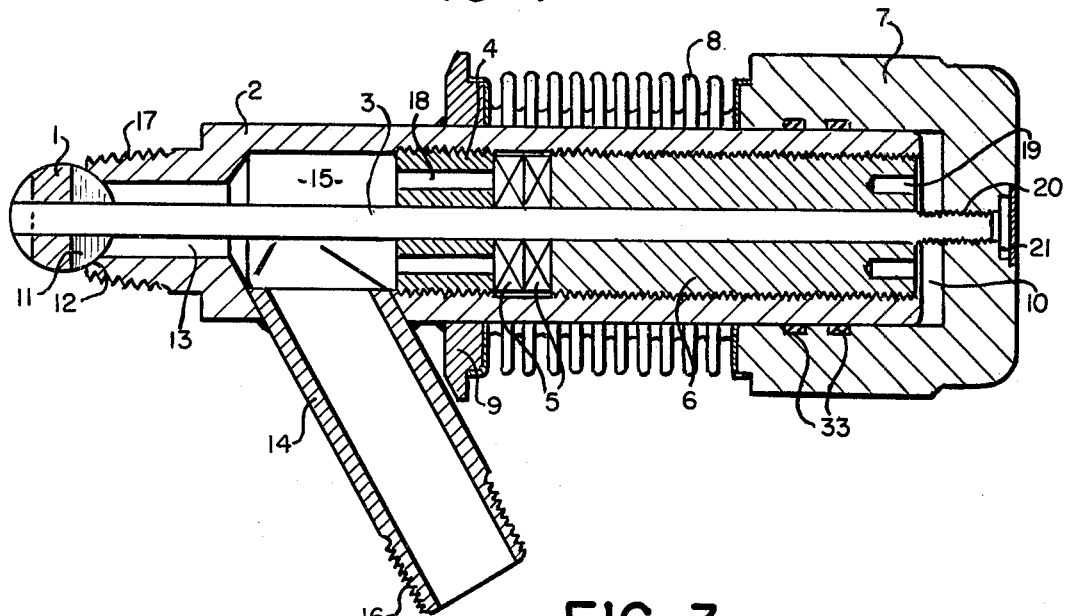
FIG. 1 is a cross-sectional view of a cock valve in accordance with the preferred embodiment of the present invention.

Referring now to the drawings in detail, common for all embodiments is a closure member 1 which is shown to be situated outside a housing 2, secured at the end of a rod 3 which runs through a core 4 with some seals 5 and another core 6 to a piston 7. The housing 2 is surrounded by a spring pipe 8 which extends from the piston 7 to a flange 9 which may be a part of housing 2. Between the upper end of the housing 2 and piston 7 is an upper chamber 10 which defines the length of stroke of piston 7 and thus the stroke of the rod 3 and the closure member 1. Furthermore, this chamber 10 is operative in sensing the pressure inside the valve. The closure member 1 is shown in the shape of a sphere with a seal 11 which may have the shape of a half sphere or a non-metallic material, vulcanized or otherwise fastened to the external half sphere. Closure member 1 fits against a valve-seat 12 in the first port 13. In FIG. 1 the second port 14 is shown in the shape of a spout which emanates from a flow chamber 15. Both ports are furnished with a thread 16 and 17. The cores 14 and 15 may have borings 18 and 19 to give hold for tools to screw the cores in and out, and also to secure the seals 5. In the core 14, the borings 18 are shown to connect chamber 15 with the seals 5 so that the latter may be put under pressure from the flow material passing chamber 15. The rod 3 and the piston 7 are shown to be joined by a thread 20 the open exit of which may be sealed by soldering or a cover 21. The valve is assembled in such a manner that the spring pipe 8 is compressed by some millimeters so that a certain spring force is created to force the closure member 1, 11 tight against the seat 12.

Figure 2:
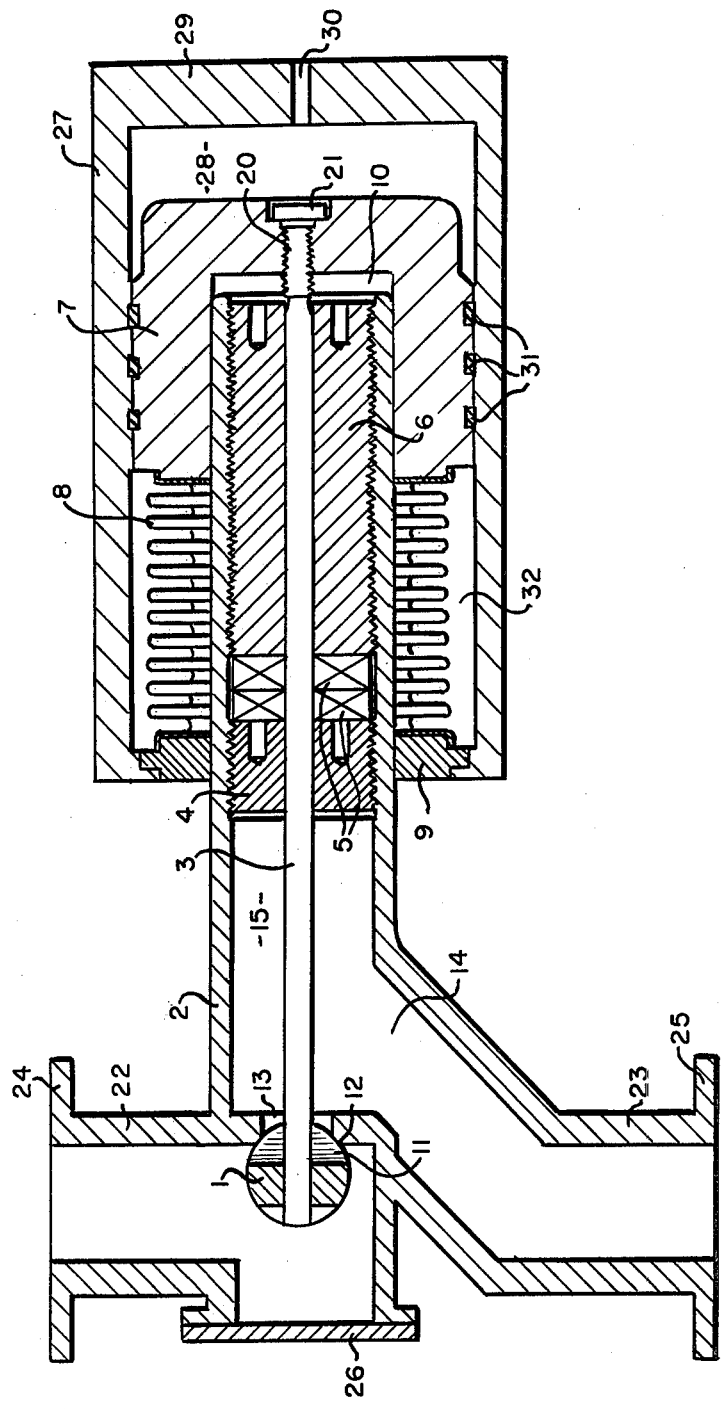
FIG. 2 is a cross-sectional view, similar to FIG. 1, of a control or safety valve in accordance with the present invention.

In FIG. 2 the same elements are shown in connection with the embodiment of the invention in the shape of a control or safety valve, which additionally is furnished with means for remote control. The lower part of the housing 2 is elongated to include a first and a second segment 22, 23, respectively, with a first and a second flange 24, 25, respectively, as well as a third or service flange 26 opposite closure member 1, 11. When the valve is used as a control valve the material flows in through segment 22 and out through segment 23. When used as a safety valve, flange 23 faces the pressure system which from chamber 15 is directed against the inner surface of the closure member 1, 11.

The mechanisms for remote control consist of an integrated pressure cylinder 27 extending coaxially with the housing 2 from flange 9 along piston 7 in mutually gliding relationship, and forming a pressure chamber 28 between the upper end of the piston 7 and an end plate 29 with a channel 30 for the introduction of a pressure line for either pneumatic, hydraulic or electric devices inside chamber 28. To seal chamber 28 there may be seals 31 between the mutual gliding surfaces of piston 7 and cylinder 27. Cylinder 27 can be screwed on to flange 9 by a thread (not shown). Chamber 10 can contain a spring (not shown) to increase the pressure of the closure member 1, 11 against its seat 12. Equally there may be a wound spring inside chamber 32 coaxially with the spring pipe 8, pressing against the flange 9 and the lower end of piston 7.

Figure 3:
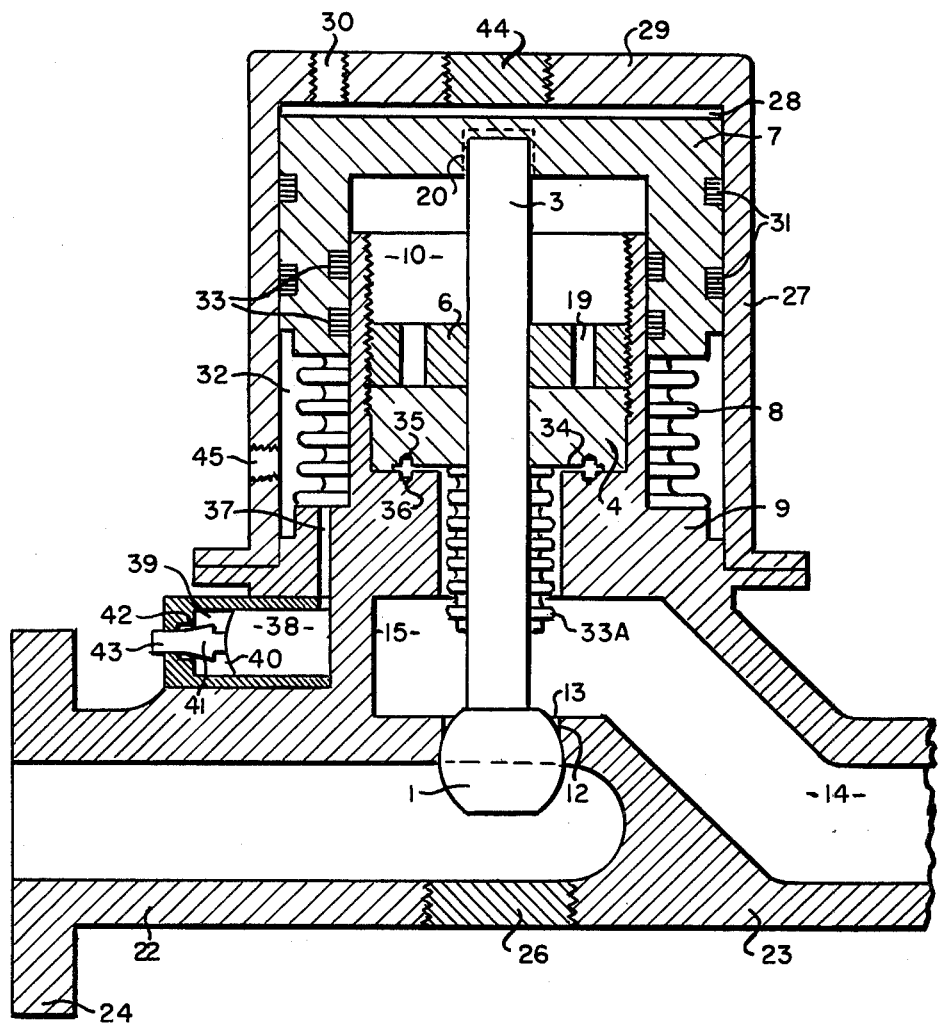
FIG. 3 is a cross-sectional view, similar to FIG. 2, of an alternative embodiment of the control valve of FIG. 2.

Referring now to FIG. 3, the same type of control valve as described with reference to FIG. 2 is shown, with certain integrated additional features being provided in the valve of FIG. 3. Thus, as shown and preferred in FIG. 3, housing 2 adjacent to chamber 15 forms a recess to accommodate a bellows 33 which at its lower end is tightly fastened to the rod 3 and at its upper end by means of a flange 34 to the housing and the lower core 4 which is forced into tight contact with the housing 2, and thus with flange 34 by the threaded upper core 6. In this embodiment seals 5 are replaced by seals 35 and 36, if necessary, which preferably consist of O-rings. Furthermore, as shown and preferred in FIG. 3, a channel 37 is provided which connects the inner space of spring pipe 8 with an inner chamber 38 which, in this case, is separated from an outer chamber 39 by means of a membrane 40 which on its outside carries a tapered pin 41 which fits into a similarly tapered opening 42 at the front end of outer chamber 39 extending outside it by a point 43. This arrangement 37–43 permits the visual or instrumental monitoring of the position of the closure member 1, 11. When the valve is closed the spring pipe 8 is elongated, the membrane 40 is relaxed and point 43 is retracted. When the valve is open, the spring pipe 8 is compressed, the membrane 40 is tensed by the displaced atmosphere in spring pipe 8 and point 43 is extended. Should the pressure inside chamber 39 exceed a predefined level, membrane 40 will be inflated to such a degree that the tapered pin 41 is forced into the tapered opening 42 to plug it against any possible leakage. The security of this effect is increased by the fact that the membrane will be forced as a lining against the inner surface of chamber 39.

Chambers 38, 39 may, of course, also be furnished with electronic-chemical and radiation monitors to indicate the state of the atmosphere inside spring pipe 8. For example, a running observation of the oxygen contents in that space could be provided to indicate whether any contamination from the system has penetrated the various seals so that an alarm could be given in good time before any accident could occur. It can also be seen that rod 3 is preferably inseparably connected with an all metallic closure member 1, and that rod 3 is connected by a thread 20 to piston 7 without an outer opening in said piston 7. Furthermore, end plate 29 may be furnished with a threaded bore 44 which may be used to control the valve manually by a handwheel with threaded stem. The bore 44 can be secured by a plug whose removal preferably requires a special tool not available to unauthorized persons. A bore 45 permits the introduction of a pneumatic or hydraulic pressure medium into space 32.

Consequently, a valve provided in accordance with the present invention may be made in relatively simple designs for simple duties and in more complex designs for increased safety, may be controlled remotely or may function as a sample-extracting-cock or as a control or gate valve.

What is claimed is:

1. A valve apparatus for fluid and gaseous materials comprising a valve housing having a first port at one end and a second port, said housing further comprising a flow chamber, a pressure chamber and a core at the other end of said housing, a controllable closure member associated with said first port and connected to said second port, said valve having at its other end control organs for said closure member, said closure member being adapted for opening said first port with an outwardly directed linear movement and being fastened to one end of a linearly movable rod which extends from said first port through said flow chamber and further through said core in the other end of the housing and from there through said pressure chamber to a firm connection with an end plate of a linearly movable piston, said piston surrounding said other end of the housing in gliding mutual contact, said piston being connected at its lower end to one end of a spring pipe, said spring pipe coaxially surrounding the housing and being fastened at its other end to a flange on the housing.

2. A valve apparatus in accordance with claim 1 wherein the closure member is positioned outside said first port, said first port having an annular outer surface, said closure member having a seat situated on said annular outer surface.

3. A valve apparatus in accordance with claim 2 wherein said closure member has a substantially spherical shape fitting into a corresponding seat.

4. A valve apparatus in accordance with claim 1 wherein said closure member has a substantially spherical shape fitting into a corresponding seat.

5. A valve apparatus in accordance with claim 1 wherein said core is in at least two parts and includes at least one seal.

6. A valve apparatus in accordance with claim 5 wherein said seals are situated between a foremost and a rearmost core.

7. A valve apparatus in accordance with claim 6 wherein said core includes a screwable part and said seals are adapted to be tightened or replaced by means of said screwable part of said core.

8. A valve apparatus in accordance with claim 6 further comprising channels connecting said flow chamber through said foremost core with said seals, said seals being adapted to be tightened with the help of the pressure exerted by the material which flows through said channels connecting said flow chamber through said foremost core with said seals.

9. A valve apparatus in accordance with claim 1 wherein said rod is fastened to said piston by a thread, said closure member comprising a surface adapted for the use of a tool.

10. A valve apparatus in accordance with claim 1 wherein said valve further comprises seals disposed between said piston and said housing at their mutually gliding surfaces.

11. A valve apparatus in accordance with claim 1 wherein said spring pipe is fastened at both ends to said opposing parts of said valve by either soldering, welding or gluing.

12. A valve apparatus in accordance with claim 1 wherein said piston is exposed to manual control.

13. A valve apparatus in accordance with claim 1 wherein said valve further comprises integrated remote control means which press against said piston.

14. A valve apparatus in accordance with claim 13 wherein said remote control means includes a pressure chamber which surrounds said piston by an end plate and a cylindrical part which runs coaxially with said housing and is fastened to said flange, said cylindrical part having a mutually gliding surface against said piston's outer surface, said pressure chamber being fitted to receive either pneumatic, hydraulic or electric pressure means.

15. A valve apparatus in accordance with claim 14 wherein said valve further comprises seals at the mutually gliding surface between said piston and said cylindrical part of said pressure chamber 16. A valve apparatus in accordance with claim 15 wherein said outer pressure surface of said piston has a larger area than said outer surface of said closure member.

17. A valve apparatus in accordance with claim 13 wherein said outer pressure surface of said piston has a larger area than said outer surface of said closure member.

18. A valve apparatus in accordance with claim 14 wherein said outer pressure surface of said piston has a larger area than said outer surface of said closure member.

19. A valve apparatus in accordance with claim 13 wherein said outer pressure surface of said piston has a smaller area than the combined surfaces of said closure member, the internal pressure surface of said piston and the surface of said piston facing the internal space of said spring pipe.

20. A valve in accordance with claim 19 wherein said pressure chamber under said piston is furnished with a booster spring.

21. A valve apparatus in accordance with claim 20 wherein the space inside said spring pipe is furnished with a booster spring pressing against said piston and said flange, respectively.

22. A valve apparatus in accordance with claim 14 wherein said outer pressure surface of said piston has a smaller area than the combined surfaces of said closure member, the internal pressure surface of said piston and the surface of said piston facing the internal space of said spring pipe.

23. A valve apparatus in accordance with claim 22 wherein said pressure chamber under said piston is furnished with a booster spring.

24. A valve apparatus in accordance with claim 23 wherein the space inside said spring pipe is furnished with a booster spring pressing against said piston and said flange, respectively.

25. A valve apparatus in accordance with claim 15 wherein said outer pressure surface of said piston has a smaller area than the combined surfaces of said closure member, the internal pressure surface of said piston and the surface of said piston facing the internal space of said spring pipe.

26. A valve apparatus in accordance with claim 25 wherein said pressure chamber under said piston is furnished with a booster spring.

27. A valve apparatus in accordance with claim 26 wherein the space inside said spring pipe is furnished with a booster spring pressing against said piston and said flange, respectively.

28. A valve apparatus in accordance with claim 1 wherein said valve is fitted for a flow from said first port to said second port and vice versa.

29. A valve apparatus in accordance with claim 1 wherein said flow chamber comprises a sealing bellows surrounding the lower part of said rod, being fastened to it fluid and gas tight at one end, and at its other end in the same manner to the central part of either said housing or said core.

30. A valve apparatus in accordance with claim 1 further comprising a monitor chamber and a channel running from the inner space of said spring pipe either through said flange or said piston to said monitor chamber, said monitor chamber comprising instrumentation means for indicating the atmospheric pressure and purity inside said spring pipe.

31. A valve apparatus in accordance with claim 14 wherein said cylindrical part of said pressure chamber at any point opposite said spring pipe comprises a suitable channel for enabling introduction of either a pneumatic or hydraulic pressure medium into the space defined by said part of said pressure chamber and said piston as well as by said flange of of said housing and the spring pipe.

32. A valve apparatus in accordance with claim 15 wherein said cylindrical part of said pressure chamber at any point opposite said spring pipe comprises a suitable channel for enabling introduction of either a pneumatic or hydraulic pressure medium into the space defined by said part of said pressure chamber and said piston as well as by said flange of said housing and the spring pipe.

33. A valve apparatus in accordance with claim 16 wherein said cylindrical part of said pressure chamber at any point opposite said spring pipe comprises a suitable channel for enabling introduction of either a pneumatic or hydraulic pressure medium into the space defined by said part of said pressure chamber and said piston as well as by said flange of said housing and the spring pipe.

34. A valve apparatus in accordance with claim 19 wherein said cylindrical part of said pressure chamber at any point opposite said spring pipe comprises a suitable channel for enabling introduction of either a pneumatic or hydraulic pressure medium into the space defined by said part of said pressure chamber and said piston as well as by said flange of said housing and the spring pipe.

35. A valve apparatus in accordance with claim 20 wherein said cylindrical part of said pressure chamber ay any point opposite said spring pipe comprises a suitable channel for enabling introduction of either a pneumatic or hydraulic pressure medium into the space defined by said part of said pressure chamber and said piston as well as by said flange of said housing and the spring pipe.

36. A valve apparatus in accordance with claim 21 wherein said cylindrical part of said pressure chamber ay any point opposite said spring pipe comprises a suitable channel for enabling introduction of either a pneumatic or hydraulic pressure medium into the space defined by said part of said pressure chamber and said piston as well as by said flange of said housing and the spring pipe.

37. A valve apparatus in accordance with claim 14 wherein said end plate of said pressure chamber includes a threaded bore for use in conjunction with a handwheel having a correspondingly threaded stem, said bore being adapted to be plugged by a plug.

38. A valve apparatus in accordance with claim 15 wherein said end plate of said pressure chamber includes a threaded bore for use in conjunction with a handwheel having a correspondingly threaded stem, said bore being adapted to be plugged by a plug.

39. A valve apparatus in accordance with claim 16 wherein said end plate of said pressure chamber includes a threaded bore for use in conjunction with a handwheel having a correspondingly threaded stem, said bore being adapted to be plugged by a plug.

40. A valve apparatus in accordance with claim 19 wherein said end plate of said pressure chamber includes a threaded bore for use in conjunction with a handwheel having a correspondingly threaded stem, said bore being adapted to be plugged by a plug.

41. A valve apparatus in accordance with claim 20 wherein said end plate of said pressure chamber includes a threaded bore for use in conjunction with a handwheel having a correspondingly threaded stem, said bore being adapted to be plugged by a plug.

42. A valve apparatus in accordance with claim 21 wherein said end plate of said pressure chamber includes a threaded bore for use in conjunction with a handwheel having a correspondingly threaded stem, said bore being adapted to be plugged by a plug.

* * * * *